United States Patent
Shao et al.

(10) Patent No.: US 9,030,945 B2
(45) Date of Patent: May 12, 2015

(54) WIRELESS COMMUNICATION DEVICE THAT IS CAPABLE OF IMPROVING DATA TRANSMISSION EFFICIENCY, ASSOCIATED NETWORK, AND METHOD

(71) Applicant: NEC Communication Systems, Ltd.

(72) Inventors: Peng Shao, Tokyo (JP); Stefan Aust, Tokyo (JP); Akira Matsumoto, Tokyo (JP); Tetsuya Ito, Tokyo (JP); Peter Davis, Kyoto (JP)

(73) Assignee: NEC Communication Systems, Ltd., Tokyo (JP)

( * ) Notice: Subject to any disclaimer, the term of this patent is extended or adjusted under 35 U.S.C. 154(b) by 0 days.

(21) Appl. No.: 14/505,815

(22) Filed: Oct. 3, 2014

(65) Prior Publication Data

US 2015/0023181 A1    Jan. 22, 2015

Related U.S. Application Data

(63) Continuation of application No. 13/494,447, filed on Jun. 12, 2012, now Pat. No. 8,879,402.

(30) Foreign Application Priority Data

Jun. 14, 2011    (JP) ................................. 2011-132314

(51) Int. Cl.
*H04W 24/06*    (2009.01)
*H04W 24/02*    (2009.01)
*H04L 12/24*    (2006.01)
*H04L 12/26*    (2006.01)
*H04W 88/02*    (2009.01)
*H04W 74/08*    (2009.01)

(52) U.S. Cl.
CPC .............. *H04W 24/06* (2013.01); *H04W 24/02* (2013.01); *H04W 74/0825* (2013.01); *H04L 41/0654* (2013.01); *H04L 43/0805* (2013.01); *H04W 88/02* (2013.01)

(58) Field of Classification Search
CPC ......... H04L 43/50; H04L 43/00; H04L 43/04; H04L 1/00; H04L 1/0001; H04B 17/00; H04B 17/004; H04B 17/0042; H04B 17/005; H04B 17/0052; H04B 17/0057; H04B 17/006; H04B 17/0075; H04B 17/008; H04W 24/00; H04W 24/02; H04W 24/06
See application file for complete search history.

(56) References Cited

U.S. PATENT DOCUMENTS 7,039,038 B2    5/2006    Shoemake
(Continued)

FOREIGN PATENT DOCUMENTS

JP    H04-373341 A    12/1992
(Continued)

OTHER PUBLICATIONS

Japanese Office Action dated Jan. 27, 2015; Application No. 2011-132314.
IEEE Standard for Information Technology—Telecommunications and information exchange between systems—Local and metropolitan area networks—Specific requirements, Part 11: Wireless LAN Medium Access Control (MAC) and Physical Layer (PHY) Specification, IEEE Std 8002.11-2007.

*Primary Examiner* — Chi H Pham
*Assistant Examiner* — Weibin Huang
(74) *Attorney, Agent, or Firm* — Young & Thompson

(57) ABSTRACT

A wireless communication device includes a data transmission and reception section that wirelessly transmits a plurality of test packets; a signal sensing section that senses a power of a spatial radio wave signal on a frequency channel that is the same as the plurality of test packets and outputs sample data of the sensed spatial radio wave signal; a calculation processing section that converts the sample data into time series sample data; a collision detection section that calculates a packet collision rate based on the number of packet collisions and the number of the plurality of test packets if there is a packet collision due to interference of the plurality of test packets with another communication; and a control section that adjusts a parameter that the data transmission and reception section uses based on a calculation result of the collision detection section.

7 Claims, 11 Drawing Sheets

(56) References Cited

U.S. PATENT DOCUMENTS

| | | | |
|---|---|---|---|
| 7,961,796 B2 * | 6/2011 | You et al. | 375/260 |
| 8,000,226 B2 * | 8/2011 | Miyoshi et al. | 370/208 |
| 2010/0167654 A1 | 7/2010 | Son | |
| 2013/0122825 A1 * | 5/2013 | Deforge et al. | 455/73 |

FOREIGN PATENT DOCUMENTS

| | | |
|---|---|---|
| JP | 07-307759 | 11/1995 |
| JP | 09-064884 | 3/1997 |
| JP | 2002-325084 A | 11/2002 |
| JP | 2010-233187 | 10/2010 |

* cited by examiner

N data pieces   packet of interference wave

⬇ first calculation of average powers (B1)

⬇ second calculation of average powers (B2)

⬇ calculate power differences of adjacent data pieces (B3)

↑:electric power of sensed signal    ↑:power differences of adjacent data pieces Fig.10A
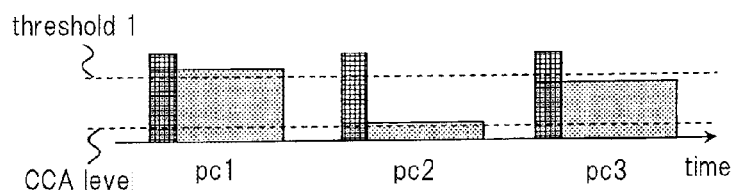
Fig.10B  extraction of envelop characteristics
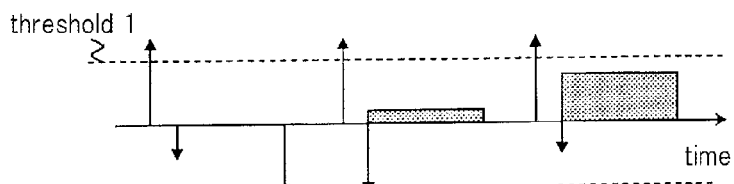
Fig.10C
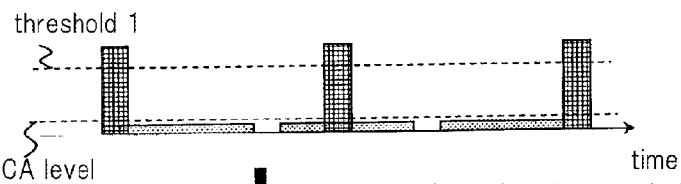
Fig.10D  extraction of envelop characteristics
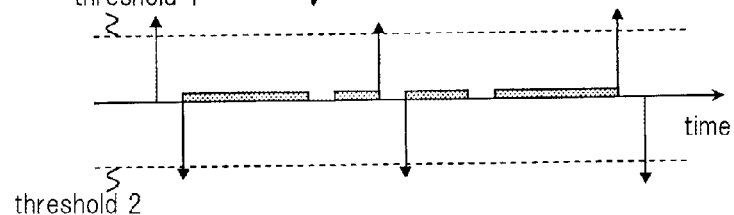

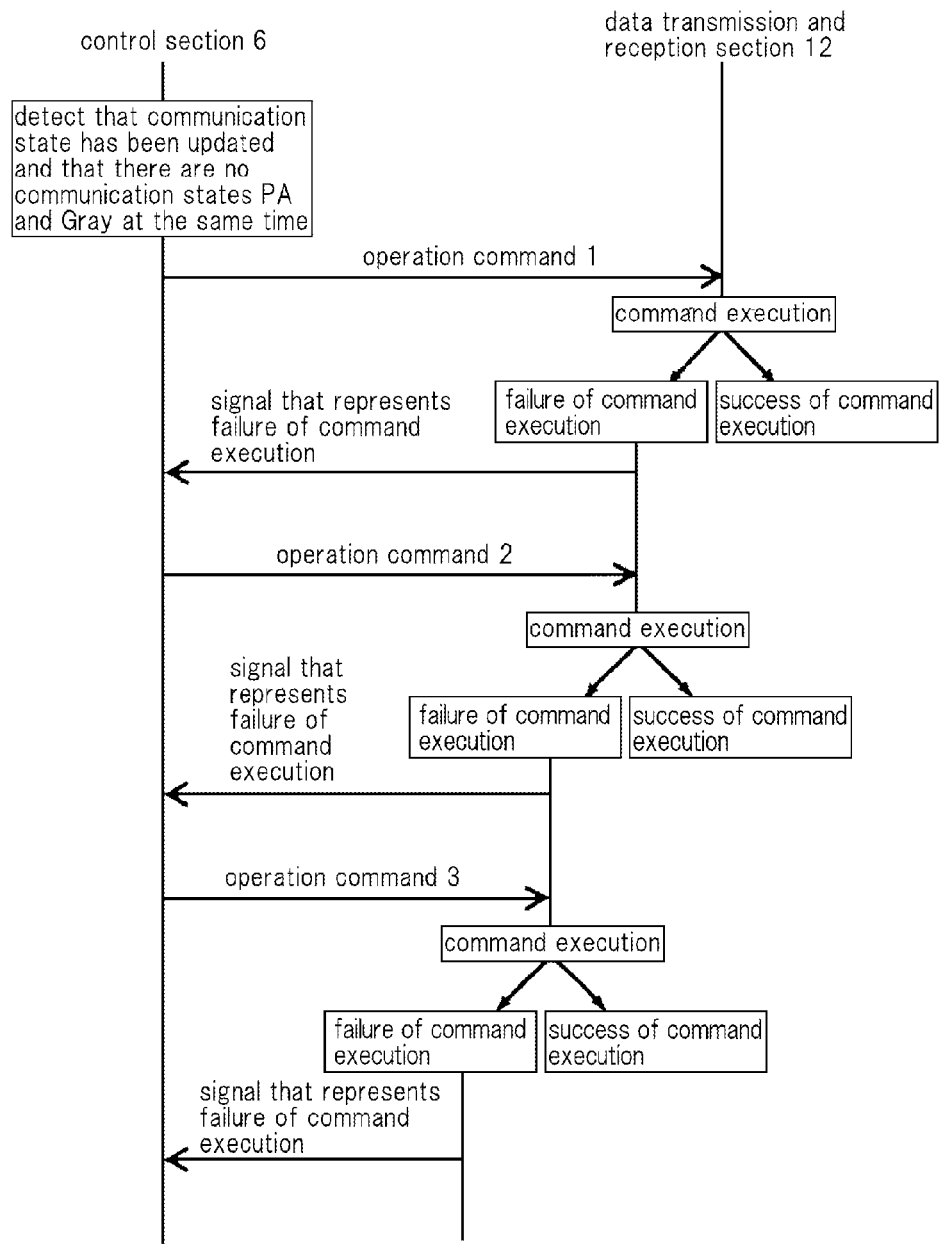

US 9,030,945 B2

WIRELESS COMMUNICATION DEVICE THAT IS CAPABLE OF IMPROVING DATA TRANSMISSION EFFICIENCY, ASSOCIATED NETWORK, AND METHOD

This application is based upon and claims the benefit of priority from Japanese Patent Application No. 2011-132314 filed on Jun. 14, 2011, the content of which is incorporated by reference.

BACKGROUND OF THE INVENTION

1. Field of the Invention

The present invention relates to a wireless communication device, a network, a wireless communication method, and a program that causes a computer to execute the method.

2. Description of Related Art

In recent years, wireless LAN (Local Area Network) communication has become common not only in companies' workplaces, but also in a variety of fields including homes and outdoors. Because the use of wireless LAN has become widespread, there has been an increase in the traffic in available frequency resources, that are limited, thereby creating serious concern about communication interference.

IEEE 802.11, which is one of the wireless LAN standards, uses an access control technique that is referred to as carrier sense multiple access with collision avoidance (CSMA/CA). This access control technique has a feature in which each wireless communication device starts communication after determining whether or not the neighboring wireless communication devices are generating radio waves.

In the foregoing access control technique, to avoid a communication collision, a wireless communication device of interest determines whether or not a neighboring device (another wireless communication device) is generating a radio wave. If the neighboring device is generating a radio wave, the device of interest waits for a predetermined time (back-off time) and then determines again whether or not the neighboring device is generating a radio wave. If the neighboring device is not transmitting a radio wave, the device of interest transmits a radio wave after the elapse of a random time. The wireless communication device of interest uses a carrier sense scheme so as to determine whether or not the neighboring device is generating a radio wave.

In the carrier sense scheme, the wireless communication device checks for the use of a radio channel. If the device detects the preamble of a signal that complies with the IEEE 802.11 standard (synchronization establishment signal), since the device receives the signal, the radio channel becomes busy. If the wireless communication device cannot receive the preamble of the signal that complies with the IEEE 802.11 standard and detects a power level that is greater than a predetermined carrier sense threshold, the wireless communication device determines that the radio channel is busy and waits to transmit a signal. In contrast, if the wireless communication device detects a power level lower than the predetermined carrier sense threshold, the wireless communication device determines that the radio channel is idle.

The foregoing access control technique has the following problem. In the following description, a wireless communication device that complies with IEEE 802.11 is referred to as "802.11 wireless device."

The CSMA/CA scheme used to control transmission and reception for an 802.11 wireless device has a problem in which, due to an external interference, a packet collision cannot be fully avoided. In addition, since a packet collision cannot be detected, if a communication failure occurs due to a packet collision, the cause of the communication failure cannot be identified and thereby effective prevention measures cannot be implemented. If a packet collision occurs due to external interference, since there are no means to quantitatively calculate the collision rate, it is difficult to accurately evaluate the collision rate.

A packet collision detection technique disclosed in JP 09-64884A Publication (hereinafter referred to as Patent Literature 1) simultaneously transmits a signal and observes the signal over a transmission path, removes the transmission signal from the observed signal, and determines whether or not a signal collision occurs over the transmission path based on the energy amount of the signal from which the transmission signal was removed.

An alternative packet detection technique disclosed in JP 2010-23387A Publication (hereinafter referred to as Patent Literature 2) calculates data collision likelihood based on the number of neighboring wireless terminals, radio transmission rates, and so forth.

Although the technique disclosed in Patent Literature 1 can determine whether or not there is an interference signal other than a transmission signal, it cannot determine whether or not the measured interference signal interferes with a signal received on the reception side. In addition, although a signal that the transmission side cannot measure may interfere with a signal received on the reception side, the technique cannot detect the interference.

The technique disclosed in Patent Literature 2 calculates the data collision likelihood based on the predicted wireless communication state. If the predicted wireless communication state largely differs from the real wireless communication state, the calculated collision rate will not comply with the real wireless communication state. The techniques disclosed in Patent Literature 1 and Patent Literature 2 can not detect packet collisions with sufficient accuracy. Thus, countermeasures to improve data transmission efficiencies cannot be taken.

In addition, the influence of external interference of wireless LAN communication depends on the interference distance and the power intensity of the interference wave. Thus, an 802.11 wireless device cannot accurately identify such different interference states. As a result, countermeasures to improve data transmission efficiencies cannot be taken based on interference states.

SUMMARY

An object of the present invention is to provide a wireless communication device, a network, and a wireless communication method that can suppress interference with another communication and that can allow data transmission efficiencies to improve, and also a program that can cause a computer to execute the method.

A wireless communication device according to the present invention includes a data transmission and reception section that wirelessly transmits a plurality of test packets; a signal sensing section that senses a power of a spatial radio wave signal on a frequency channel that is the same as the plurality of test packets and outputs sample data of the sensed spatial radio wave signal; a calculation processing section that converts the sample data that are output from the signal sensing section into time series sample data in which the sample data are plotted in time series; a collision detection section that determines whether or not there is a packet collision due to interference of the plurality of test packets with another communication based on the time series sample data and calculates a packet collision rate based on the number of packet collisions and the number of the plurality of test packets that have been transmitted if the packet collision occurs; and a control section that adjusts a parameter that the data transmission and reception section uses to transmit data based on a calculation result of the collision detection section.

The above and other objects, features and advantages of the present invention will become apparent from the following description with reference to the accompanying drawings which illustrate examples of the present invention.

BRIEF DESCRIPTION OF THE DRAWINGS

FIG. 10A to FIG. 10D are schematic diagrams describing two types of estimated packet collision patterns;

FIG. 11 is a schematic diagram showing a procedure of a communication control operation in which the wireless communication device according to the first embodiment identifies one communication state when a communication state has been updated;

DETAILED DESCRIPTION OF THE EXEMPLARY EMBODIMENTS

Next, a wireless communication device that complies with the 802.11 wireless LAN standard as an embodiment of the present invention will be described. In the following, a wireless communication device that complies with IEEE 802.11 is referred to as "802.11 wireless device, "a wireless transmission device that complies with IEEE 802.11 is referred to as "802.11 wireless transmission device," and a wireless reception device that complies with IEEE 802.11 is referred to as "802.11 wireless reception device."

First Embodiment

Figure 1:
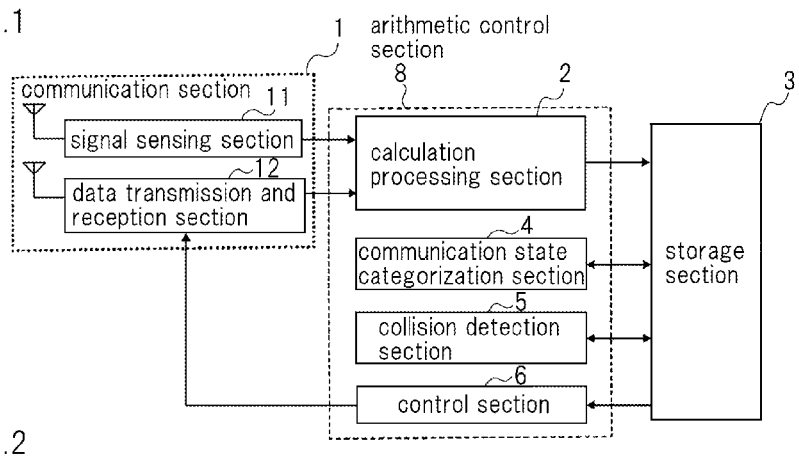
FIG. 1 is a block diagram showing an example of a structure of a wireless communication device according to a first embodiment.

Next, a structure of the wireless communication device according to a first embodiment will be described. FIG. 1 is a block diagram showing an example of the structure of the wireless communication device according to this embodiment.

As shown in FIG. 1, the wireless communication device according to this embodiment has communication section 1 that performs data communication and signal sensing; calculation processing section 2 that performs an initial process for a reception signal and calculates communication evaluation parameters; storage section 3 that stores information; communication state categorization section 4 that categorizes the communication state of its own device that suffers from interference with another communication; collision detection section 5 that detects a communication collision and evaluates it; and control section 6 that adjusts communication performance of communication section 1.

Arithmetic control section 8 includes calculation processing section 2, communication state categorization section 4, collision detection section 5, and control section 6. Arithmetic control section 8 is provided with a CPU (Central Processing Unit) (not shown) that executes a process according to a program; and memory (not shown) that stores the program. Calculation processing section 2, communication state categorization section 4, collision detection section 5, and control section 6 are virtually configured by the CPU that executes the program.

Communication section 1 has signal sensing section 11 and data transmission and reception section 12. Signal sensing section 11 is provided with a reception antenna. Signal sensing section 11 senses the power of a spatial radio wave signal in a frequency region that is the same as the frequency channel that the wireless communication device according to this embodiment uses when it transmits a signal.

Data transmission and reception section 12 is provided with a transmission and reception antenna. Data transmission and reception section 12 transmits and receives data and test packets that the wireless communication device according to this embodiment processes and gather statistics of transmission and reception parameters with respect to packets that are transmitted and received. Transmission and reception parameters are, for example, "a time that a transmission packet occupies," "a time after the first packet of a set of data is transmitted until the last packet is transmitted," "the number of transmission packets," "the number of transmission success packets," and "the number of transmission packets per unit time."

Calculation processing section 2 converts power data of the spatial radio wave signal supplied form signal sensing section 11 into time series data and calculates communication evaluation parameters based on the transmission and reception parameters supplied from data transmission and reception section 12. The communication evaluation parameters are, for example, "Busy Count (bc)," "Delivery Ratio (dr)," "Standard Deviation of delivery ratios (Std(dr))."

Parameter bc represents the ratio of a time for which it is determined that a channel of interest is likely to be used. Parameter bc is obtained by dividing a time for which the channel of interest is busy by the measurement time. Parameter bc may be referred to as busy rate. If parameter bc cannot be continuously measured, it may be obtained by sampling the channel in the measurement time, counting the number of samples for which the channel is busy, and dividing the number of samples for which the channel is busy by the number of samples in the measurement time. Parameter dr represents a transmission success rate. Parameter dr is given by formula (1) that follows.

[Mathematical Expression 1]

$$dr = \frac{TxFrame}{TxCount} \quad \text{Formula (1)}$$

where TxFrame is the number of transmission success packets in the measurement time and TxCount is the number of transmission packets in the measurement time.

Parameter Std(dr) represents the standard deviation of delivery ratios (dr) in a constant time.

Communication state categorization section 4 determines in which one of three states of its own device lies due to the influence of interference of its transmission with another communication. The three states categorized by the communication evaluation parameters are "Performance Anomaly State (PA)," "Gray State (Gray)," and "Max Performance State (Good)."

State PA represents a communication state in which a high speed transmission communication device and a low speed transmission communication device can detect each other and the throughput of the high speed transmission communication device is lower than the throughput of the low speed transmission communication device. In this context, the throughput represents the effective transmission amount of data per unit time. State Gray represents a communication state in which a transmission signal of an 802.11 wireless device X is not detected by another 802.11 wireless device Y, the transmission signal of the 802.11 wireless device X interferes with a transmission signal of the 802.11 wireless device Y. In state Gray, the communication success rate becomes lower due to interference with another communication. State Good represents a communication state in which a 802.11 wireless transmission device uses a whole channel or another transmission device that transmits a signal at the same rate as its own device uses the channel.

Collision detection section 5 has a means that calculates the number of test packets that the wireless communication device according to this embodiment transmits from the time series powers of the spatial radio wave signal that is output from calculation processing section 2; a means that detects collisions of test packets transmitted by the wireless communication device according to this embodiment and data packets transmitted by another wireless communication device; a means that calculates the number of collided data packets; and a means that calculates a collision rate of data packets based on the number of collided data packets and the number of test packets that the wireless communication device according to this embodiment transmits.

Control section 6 adjusts the transmission parameters based on the results that are output from communication state categorization section 4 and collision detection section 5 so as to improve the transmission efficiency of the wireless communication device according to this embodiment. According to this embodiment, communication state categorization section 4 and collision detection section 5 may independently or simultaneously operate so as to improve the transmission efficiency.

Next, with reference to FIG. 1, the operation of the wireless communication device according to this embodiment will be described in detail. First, the communication state categorization operation of the wireless communication device according to this embodiment will be described in detail.

Data transmission and reception section 12 shown in FIG. 1 executes test transmission for an 802.11 reception device at a constant transmission rate. After data transmission and reception section 12 has executed test transmission, it gathers statistics of the transmission and reception parameters and outputs the statistical result of the transmission and reception parameters to calculation processing section 2.

Thereafter, calculation processing section 2 calculates communication evaluation parameters bc, dr, and Std(dr) that serve to evaluate the transmission result of the foregoing test transmission based on the statistical results of the transmission and reception parameters supplied from data transmission and reception section 12. Thereafter, calculation processing section 2 stores the calculated results of the communication evaluation parameters to storage section 3.

Thereafter, communication state categorization section 4 stores communication evaluation parameters bc, dr, and Std (dr) that serve to evaluate test transmission to a buffer (not shown) provided in communication state categorization section 4 so as to categorize the communication state of the wireless communication device according to this embodiment. The communication state of the wireless communication device according to this embodiment is categorized as one of three states according to the communication state categorization algorithm shown in FIG. 2 due to the influence of the foregoing external interference. The three communication states are PA, Gray, and Good.

Next, with reference to FIG. 2, the communication state categorization algorithm will be described in detail. Communication state categorization section 4 is virtually configured by the CPU (not shown) that is provided in arithmetic control section 8 and that executes a program containing the communication state categorization algorithm shown in FIG. 2. Thus, in the following, it is assumed that the subject that executes the communication state categorization algorithm shown in FIG. 2 is communication state categorization section 4.

Communication state categorization section 4 determines whether or not parameter dr is greater than threshold A (at step A1). If parameter dr is greater than threshold A, communication state categorization section 4 determines whether or not parameter bc is greater than threshold B (at step A2). If parameter bc is greater than threshold B and parameter dr is greater than threshold A, communication state categorization section 4 detects that the communication state of the wireless communication device according to this embodiment lies in state PA due to the influence of an external interference signal (at step A5). State PA corresponds to a communication performance anomaly state in which, although the influence of interference with another communication is not large, a communication anomaly occurs.

Figure 2:
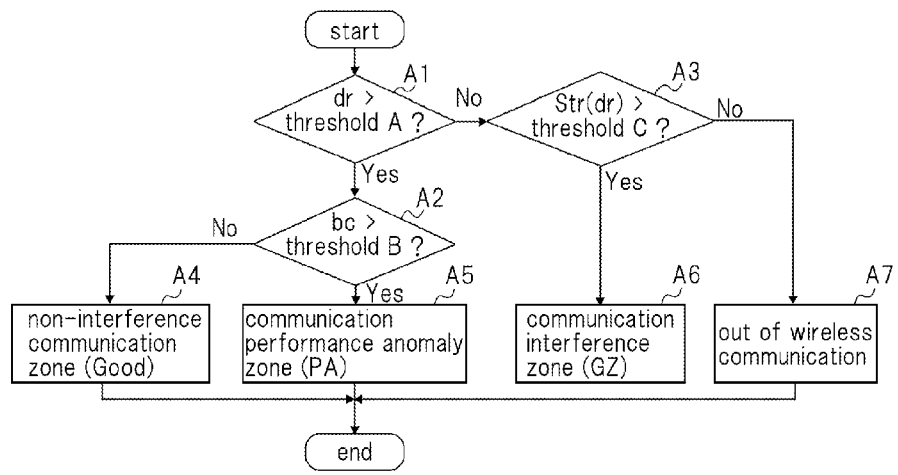
FIG. 2 is a schematic diagram showing an example of a communication state categorization algorithm executed by the wireless communication device according to the first embodiment.

In FIG. 2, if parameter dr is greater than threshold A at step A1 and if parameter bc is equal to or smaller than threshold B at step A2, communication state categorization section 4 determines that the communication state of the wireless communication device according to this embodiment lies in state Good in which the influence of the external interference signal is small (at step A4). State Good corresponds to a non-interference state in which the influence of interference with another communication hardly occurs.

If parameter dr is equal to or smaller than threshold A at step A1 shown in FIG. 2, communication state categorization section 4 determines whether or not parameter Std(dr) is greater than threshold C (at step A3). If parameter Std(dr) is greater than threshold C and parameter dr is not greater than threshold A, communication state categorization section 4 detects that the communication state of the wireless communication device according to this embodiment lies in state Gray due to the influence of an external interference signal (at step A6). The zone of state Gray is denoted by GZ. State Gray corresponds to a communication interference state in which interference with another communication occurs.

In FIG. 2, if parameter dr is equal to or smaller than threshold A and parameter Std(dr) is equal to or smaller than threshold C at step A1 shown in FIG. 2 (at step A3), communication state categorization section 4 determines that the test transmission signal of the wireless communication device according to this embodiment has not reached the wireless reception device (at step A7).

Next, threshold A, threshold B, and threshold C used in the determination process according to the communication state categorization algorithm shown in FIG. 2 will be described. Threshold A, threshold B, and threshold C depend on the performance characteristic of an 802.11 wireless communication device. Threshold A, threshold B, and threshold C correspond to determination criteria.

Threshold A is the minimum value of parameter dr of an 802.11 wireless device when one 802.11 wireless device and another 802.11 wireless device, as an interference source, simultaneously transmit respective 802.11 reception devices and they can detect each other's transmission.

Figure 3:
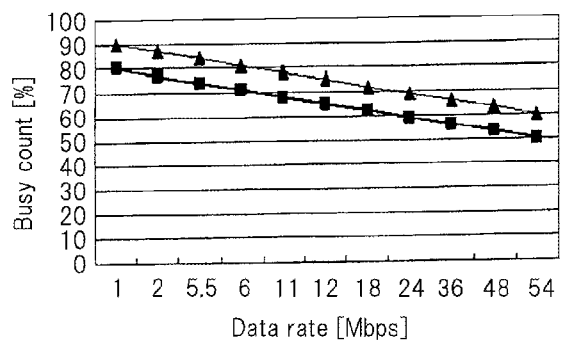
FIG. 3 is a schematic diagram showing the dependency of threshold B used in the communication state categorization algorism shown in FIG. 2 on wireless transmission rates.

Threshold B depends on a wireless transmission rate. FIG. 3 shows the dependency of threshold B on wireless transmission rates. The dependency of threshold B on the transmission rates can be obtained according to the following procedure. First, an 802.11 wireless transmission device under an environment of one communication link is caused to execute test transmission at different transmission rates to an 802.11 wireless reception device. Thereafter, the values of parameter bc at the individual transmission rates are obtained. Finally, the values of parameter bc and transmission rates are correlated. Threshold B is obtained by adding a predetermined offset to parameter bc. The communication state categorization algorithm according to this embodiment determines the communication state based on threshold B that corresponds to the test transmission rate shown in FIG. 3. FIG. 3 shows an example in which the offset is 10%. In FIG. 3, the values of parameter bc that are measured under the environment of one communication link are denoted by squares and the values of threshold B to which an offset of 10% is added are denoted by triangles.

Threshold C is the standard deviation of the values of parameter dr of an 802.11 wireless device in a predetermined time when one 802.11 wireless device and another 802.11 wireless device, as an interference source, simultaneously transmit other 802.11 wireless reception devices and they cannot detect each other's transmission. Communication state categorization section 4 stores the determined result to storage section 3.

Figure 4:
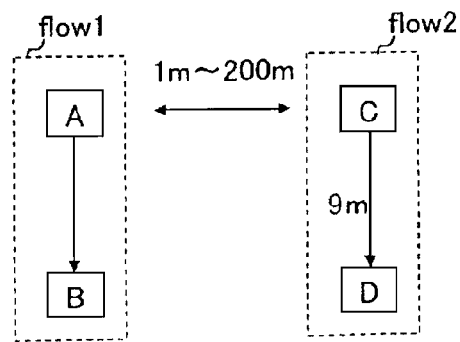
FIG. 4 is a schematic diagram specifically describing an operation of a communication state categorization method performed by the wireless communication device according to the first embodiment.

Next, with reference to FIG. 4, a specific example of the operation of the communication state categorization method for the wireless communication device according to this embodiment will be described. In FIG. 4, it is assumed that wireless device A is the wireless communication device according to this embodiment and that wireless device B, wireless device C, and wireless device D are wireless communication devices that comply with IEEE 802.11.

As shown in FIG. 4, it is assumed that wireless device A wirelessly transmits 1500-byte (fixed length) packets to wireless device B located 9 meters apart therefrom at a transmission rate of 54 Mpbs. In addition, it is assumed that wireless device C wirelessly transmits 1500-byte (fixed length) packets to wireless device D located 9 meters apart therefrom at a transmission rate of 6 Mbps. Although it is preferred that the transmission powers of wireless device A and wireless device B be fixed, they are not limited.

Packet transmission from wireless device A to wireless device B is referred to as flow1, whereas packet transmission from wireless device C to wireless device D is referred to as flow2. In this example, an interference signal of flow2 to flow1 is considered as a detection target. As flow2 is apart from flow1, the interference of flow2 to flow1 weakens. In the example shown in FIG. 4, the intensity of an interference wave of flow2 to flow1 is obtained by changing the distance between flow2 and flow1 from 1 meter to 200 meters so as to categorize the communication state of wireless device A according to this embodiment.

Figure 5:
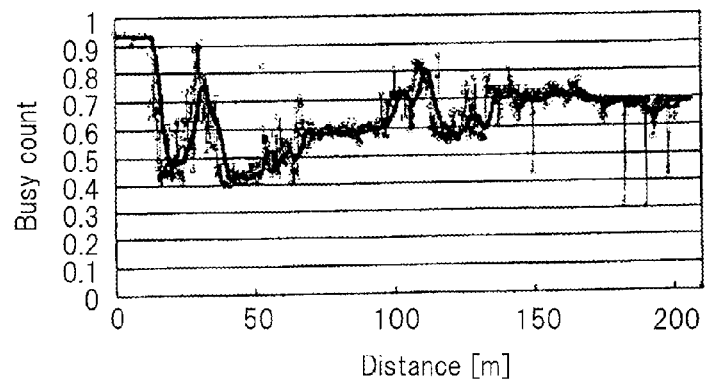
FIG. 5 is a schematic diagram showing an example of parameter be of wireless device A shown in FIG. 4.
Figure 6:
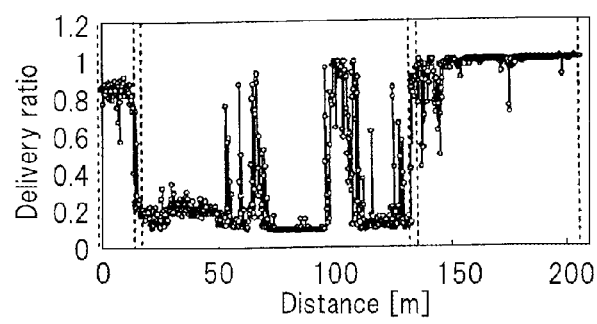
FIG. 6 is a schematic diagram showing an example of parameter dr of wireless device A shown in FIG. 4.

As flow2 starts moving from flow1 from a distance of 1 meter, data transmission and reception section 12 of wireless device A starts executing the statistical process for the transmission and reception parameters. Calculation processing section 2 of wireless device A calculates the communication evaluation parameters bc, dr, and Std(dr) based on the transmission and reception parameters supplied form data transmission and reception section 12 of wireless device A and stores the calculated results to storage section 3. In the example shown in FIG. 4, the values of parameters bc and dr obtained by calculation processing section 2 of wireless device A are shown in FIG. 5 and FIG. 6, respectively. The vertical axis of FIG. 5 represents the values of parameter bc, whereas the horizontal axis represents the values of distance. A solid line shown in FIG. 5 is a line that connects the average values of the values of parameter bc. The vertical axis of FIG. 6 represents the values of parameter dr, whereas the horizontal axis represents the values of distance.

Communication state categorization section 4 of wireless device A shown in FIG. 4 reads the communication evaluation parameters bc, dr, and Std(dr) from storage section 3 and categorizes the communication states of wireless device A in flow1, that suffers from interference with flow2, according to the communication state categorization algorithm shown in FIG. 2, while flow2 is apart from flow 1 from 1 meter to 200 meters. In the example shown in FIG. 4, threshold A and threshold C used in the communication state categorization algorithm are calculated as 80% and 0.12, respectively, according to the foregoing threshold calculation method.

The relationship between the transmission rate and threshold B obtained according to the foregoing calculation method for threshold B is shown in Table 1. Parameter bc shown in Table 1 corresponds to threshold B.

TABLE 1

| Data rate [Mbps] | Busy count [%] |
|---|---|
| 1 | 85 |
| 2 | 87 |
| 5.5 | 81 |
| 6 | 86 |
| 11 | 68 |
| 12 | 80 |
| 18 | 73 |
| 24 | 73 |
| 36 | 65 |
| 48 | 56 |
| 54 | 59 |

Figure 7:
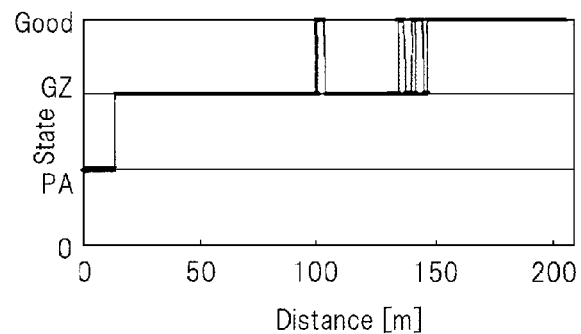
FIG. 7 is a schematic diagram showing an example of a categorized result of communication states of wireless device A shown in FIG. 4.

In the example shown in FIG. 4, with reference to Table 1 obtained according to the foregoing calculation method for threshold B, since the transmission rate is 54 Mbps, threshold B is 59%. FIG. 7 shows the categorized results of the communication states of wireless device A. The vertical axis of FIG. 7 represents communication states, whereas the horizontal axis represents distance.

Next, the collision detection operation of the wireless communication device according to this embodiment will be described.

Data transmission and reception section 12 shown in FIG. 1 transmits test packets at a maximum transmission rate (for example, 54 Mbps) for a constant time (for example, 3 seconds). At this point, collision detection section 5 counts the number of test packets that data transmission and reception section 12 transmits and stores the counted number as C1 to storage section 3. When data transmission and reception section 12 starts executing test transmission, signal sensing section 11 senses the power of the spatial radio wave signal on the same channel as the test transmission signal. After data transmission and reception section 12 has executed test transmission, signal sensing section 11 stops sensing the power of the spatial radio wave signal and outputs sample data of the sensed spatial radio wave signal to calculation processing section 2.

Thereafter, calculation processing section 2 converts the sample data of the spatial radio wave signal supplied from signal sensing section 11 into time series power sample data. Calculation processing section 2 stores the time series power sample data to storage section 3. In the following, the time series power sample data are simply referred to as "time series sample data."

Thereafter, collision detection section 5 reads the time series sample data stored in storage section 3 and detects the foregoing interference if the wireless communication device according to this embodiment suffers from interference with another 802.11 wireless device.

Figure 8:
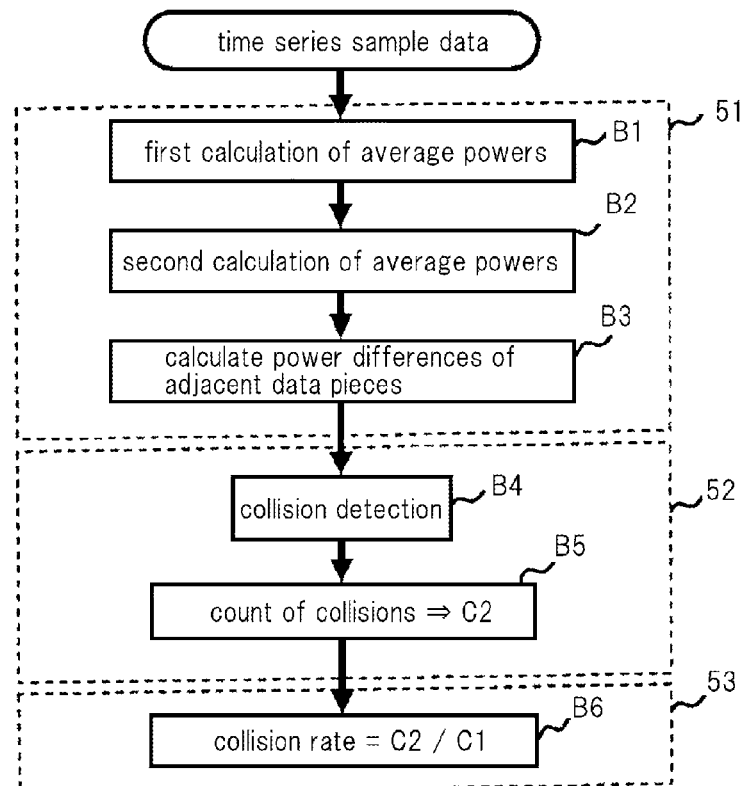
FIG. 8 is a schematic diagram showing an example of an interference detection algorithm executed by the wireless communication device according to the first embodiment.

Next, with reference to FIG. 8 and FIG. 9A to FIG. 9D, the interference detection algorithm will be described in detail. FIG. 8 is a schematic diagram showing an example of the interference detection algorithm. FIG. 9A to FIG. 9D are schematic diagrams that describe a method that detects a packet collision from the time series power sample data. The vertical axis of each of FIG. 9A to FIG. 9D represents power, whereas the horizontal axis represents time.

As shown in FIG. 8, the interference detection algorithm has average power calculation process 51, collision count statistic gathering process 52, and collision rate calculation process 53. Collision detection section 5 is virtually configured by the CPU (not shown) of arithmetic control section 8 that executes a program containing the interference detection algorithm shown in FIG. 8. Thus, it is assumed that the subject that executes each process shown in FIG. 8 is collision detection section 5.

Figure 9A:
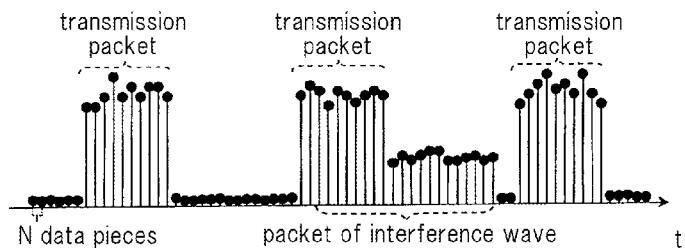
FIG. 9A to FIG. 9D are schematic diagrams describing a method that detects a packet collision from time series sample data of powers.
Figure 9B:
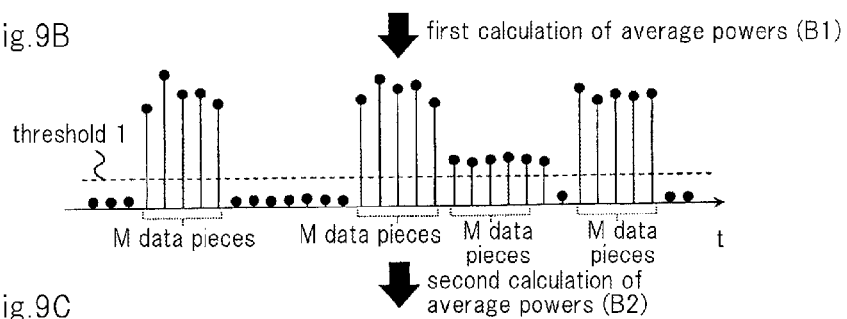

First, the operation of average power calculation process 51 will be described in detail. Collision detection section 5 calculates average powers shown in FIG. 9B as a first calculation based on the time series sample data shown in FIG. 9A (at step B1). Specifically, collision detection section 5 calculates the average power of every N data pieces of the time series sample data that are read from storage section 3 (at step B1). In the example shown in FIG. 9B, it is assumed that N=2. Black circles shown in FIG. 9A represent the powers of the sensed signals.

Figure 9C:
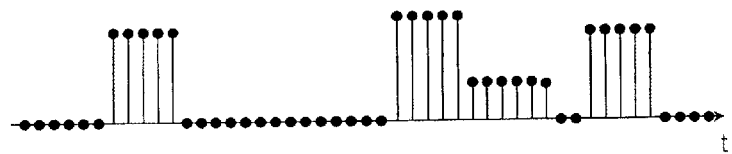

Thereafter, collision detection section 5 calculates average powers shown in FIG. 9C as a second calculation (at step B2). Specifically, collision detection section 5 successively checks for all data pieces of the powers obtained at step B1. If there is a data piece that is greater than threshold 1 and that immediately precedes (M−1) data pieces each of which is greater than threshold 1, collision detection section 5 obtains the average value of the M data pieces and treats the obtained average value as the average power of the M data pieces. In the example shown in FIG. 9C, M=5.

In contrast, if a data piece that is greater than threshold 1 is followed by M' (that is smaller than (M−1)) data pieces each of which is greater than threshold 1, collision detection section 5 obtains the average value of data pieces from "a first data piece of those whose average power is greater than threshold 1" to "a data piece immediately followed by the first data piece of those whose average power is smaller than threshold 1 (the last data piece of M' (that is smaller than (M−1)) data pieces whose average power is greater than threshold 1)." Thereafter, collision detection section 5 treats the obtained average value as the average power value of data pieces from the first data piece and the last data piece of those whose average power is greater than threshold 1.

In the same manner as the foregoing M data pieces and M' (that is smaller than (M−1)) data pieces, collision detection section 5 calculate average powers as the second calculation until the end of data pieces that correspond to the average powers obtained at step B1. In addition, collision detection section 5 substitutes the obtained average powers each of which is smaller than the noise power threshold with L (for example, three) successive 0's (at step B2). In the example shown in FIG. 9C, L=2.

In this example, N×M corresponds to the number of samples, K, of one test packet transmitted at the maximum transmission rate. When N is around 1% of K, an appropriate calculation accuracy can be obtained. Although threshold 1 depends on the performance of the device, threshold 1 needs to be greater than the carrier sense threshold. In CSMA/CA, the carrier sense threshold is used to determine whether or not a channel is busy or idle. The carrier sense threshold is also referred to as the Clear Channel Assessment level (CCA level). An appropriate noise power threshold is expected to be 1.5 times the noise average power. The noise average power is obtained by a power measurement device. Besides threshold 1, threshold 2 is defined as a power determination criteria. Although threshold 2 depends on the performance of the device, threshold 2 is obtained by multiplying threshold 1 by −1.

Collision detection section 5 obtains the power differences of adjacent data pieces for all data pieces of the time series data obtained at step B2 shown in FIG. 9C (at step B3). In other words, the value in which a later data piece is subtracted from an earlier data piece of two adjacent data pieces is defined as the power difference of adjacent data pieces. FIG.

Figure 9D:
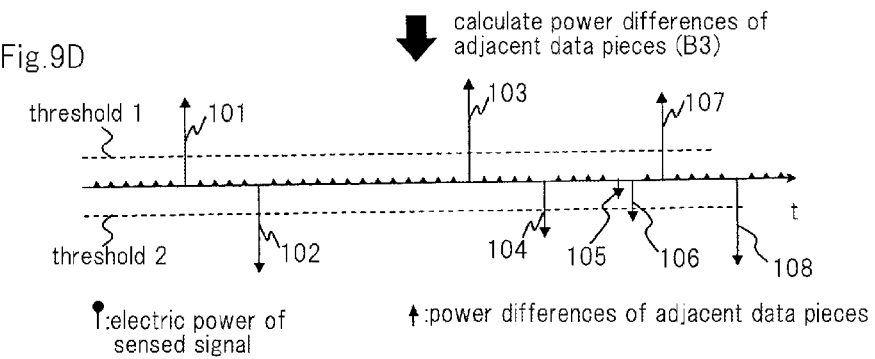

9D shows an example of the result. The upper side of the time axis of FIG. 9D represents the plus side of power differences, whereas the lower side of the time axis represents the minus side of power differences. Black triangles shown in FIG. 9D represent power differences of adjacent data pieces. FIG. 9D shows time series power difference data.

Next, the operation of collision count statistic gathering process 52 will be described in detail.

At a collision detection step (step B4), collision detection section 5 checks for time series data obtained at step B3 from the beginning. If a data piece that is greater than threshold 1 is immediately followed by "a data piece that is greater than threshold 1" rather than "a data piece that is smaller than threshold 2" (this case is referred to as case 1), collision detection section 5 counts this case as one packet collision. If case 1 does not occur, collision detection section 5 determines the next case. If threshold 1 needs to be greater than the CCA level and smaller than 50% of the power of a test packet, since no packet collision occurs in case 1, collision detection section 5 does not determine whether or not case 1 occurs.

If Z data pieces that immediately precede a data piece that is greater than threshold 1 do not contain 0 (this case is referred to as case 2) or if Y data pieces that immediately follow a data piece that is smaller than threshold 2 do not contain 0 (this case is referred to as case 3), collision detection section 5 counts this case as one packet collision. Although Z depends on the performance of the device, it is expected to be 2. Likewise, although Y depends on the performance of the device, it is expected to be 5. However, if case 2 and case 3 succeed, namely if Z data pieces that do not contain 0, immediately followed by a data piece that is greater than threshold 1, immediately followed by a data piece that is smaller than threshold 2, immediately followed by y data pieces that do not contain 0, collision detection section 5 counts one packet collision rather than two packet collisions.

On the other hand, if "a data piece that is greater than threshold 1 (this data piece is referred to as "data piece P1" is immediately preceded by Z data pieces that contain 0 and if data piece P1 is immediately followed by "a data piece that is smaller than threshold 2 (this data piece is referred to as "data piece P2" immediately followed by Y data pieces that contain 0, collision detection section 5 determines that this case corresponds to case 4 or case 5 that will be described next and counts one packet collision. Case 4 is a case in which data piece P2 is immediately followed by "a data piece that is smaller than threshold 2" instead of "a data piece that is greater than threshold 1." On the other hand, case 5 is a case in which data piece P2 is immediately followed by "a data piece that is greater than threshold 1" instead of "a data piece that is smaller than threshold 2" and the absolute value of the sum of data piece P1 and data piece P2 is greater than threshold 3. Although threshold 3 depends on the performance of the device, it is expected to be equal to threshold 1. If neither case 4 nor case 5 occurs, collision detection section 5 determines that no packet collision occurs. Collision detection section 5 stores the foregoing packet collision count C2 in storage section 3 (at step B5).

Next, with reference to FIG. 9D, the packet collision detection method in which collision detection section 5 detects a packet collision in case 4 will be described. In FIG. 9D, for the sake of description, data pieces that represent power differences of adjacent data pieces are denoted by reference numerals 101 to 108.

Data piece 101 shown in FIG. 9D complies with the condition of data piece P1 and data piece 102 complies with the condition of data piece P2. However, since data piece 102 is immediately followed by data piece 103 that is greater than threshold 1 rather than a data piece that is smaller than threshold 2, case 4 does not occur. In addition, data piece 102 is immediately followed by data piece 103 that is greater than threshold 1. However, since the absolute value of the sum of data piece 101 and data piece 102 is nearly 0 (<threshold 3), case 5 does not also occur.

Next, with reference to FIG. 9D, collision detection section 5 checks for the data along the time axis. Since data piece 103 complies with the condition of data piece P1 and data piece 104 complies with the condition of data piece P2, collision detection section 5 determines whether case 4 or case 5 occurs. With reference to FIG. 9D, since data piece 104 is immediately followed by data piece 106 that is smaller than threshold 2 rather than a data piece that is greater than threshold 1, collision detection section 5 determines that case 4 occurs. Since data piece 104 is immediately followed by data piece 105 that is smaller than threshold 1 and greater than threshold 2, data piece 105 is neither "a data piece that is greater than threshold 1" nor "a data piece that is smaller than threshold 2." Thus, collision detection section 5 excludes data piece 105 from the determination target.

In addition, with reference to FIG. 9D, collision detection section 5 checks for the data along the time axis. Data piece 107 complies with the condition of data piece P1 and data piece 108 complies with the condition of data piece P2. However, in the observation time range of the time series data exemplified in FIG. 9, since data piece 108 is not immediately followed by "a data piece that is greater than threshold 1" or "a data piece that is smaller than threshold 2," collision detection section 5 does not need to determine whether or not a packet collision occurs.

Next, the reason why threshold 1 needs to be greater than the carrier sense threshold will be described. FIG. 10A to FIG. 10D are schematic diagrams that describe two types of packet collision patterns. The vertical axis of each of FIG. 10A to FIG. 10D represents power, whereas the horizontal axis represents time. In FIG. 10A to FIG. 10D, longitudinal rectangles represent powers of transmission packets of the transmission terminal, whereas oblong rectangles represent powers of interference packets.

There are two types of packet collision patterns that are referred to as first and second patterns. FIG. 10A is a schematic diagram showing time series sample data of the first pattern, whereas FIG. 10B is a schematic diagram showing time series power difference data in which envelop characteristics are extracted from the time series sample data shown in FIG. 10A. However, FIG. 10B schematically shows an interference packet shown in FIG. 10A so as to denote that an interference packet whose power is lower than threshold 1 is a series of data pieces that are not 0.

In the first pattern shown in FIG. 10A, the power of an interference packet is greater than the carrier sense threshold. In this case, each transmission terminal can correctly detect transmission packets of other transmission terminals. Immediately after each transmission terminal determines that a channel is free, if the terminal transmits packets, packet collisions may occur as shown in FIG. 10A. As is clear from FIG. 10B, packet collision pc1 shown in FIG. 10A corresponds to case 5 in the foregoing packet collision detection determination result. On the other hand, packet collision pc2 shown in FIG. 10A corresponds to case 3 in the foregoing packet collision detection determination result.

In FIG. 10B, it is likely that packet collision pc3 is not detected. This is because test packets preceded by packet collision pc3 are not observed in the observation time shown in FIG. 10A. If test packets are detected after packet collision pc3, "a data piece that is greater than threshold 1" in packet collision pc3 is immediately followed by "a data piece that is greater than threshold 1" instead of "a data piece that is smaller than threshold 2" of the next test packet. Thus, packet collision pc3 corresponds to case 1 in the foregoing packet collision detection determination result. Consequently, according to this embodiment, it is clear that a packet collision of the first pattern can be detected.

FIG. 10C is a schematic diagram showing time series sample data of the second pattern, whereas FIG. 10D is a schematic diagram showing time series power difference data in which envelop characteristics are extracted from the time series sample data shown in FIG. 10C. However, FIG. 10D schematically shows the interference packet shown in FIG. 10C so as to denote that the interference packet whose power is lower than the carrier sense threshold is a series of data pieces that are not 0.

In the second pattern shown in FIG. 10C, the power of an interference packet is lower than the carrier sense threshold. In this case, since each transmission terminal cannot correctly detect the transmission packets of other transmission terminals, it cannot correctly determine whether or not a channel is busy. As a result, as shown in FIG. 10C, a packet that is transmitted by its own terminal collides with an interference packet that it is unable to detect. The three packet collisions shown in FIG. 10C correspond to case 2 or case 3 in the foregoing packet collision detection determination result, as is clear from FIG. 10D. Thus, according to this embodiment, a packet collision of the second pattern can be detected.

As was described with reference to FIG. 10, according to this embodiment, since threshold 1 is greater than the carrier sense threshold, the foregoing first and second collision patterns can be detected.

Next, the operation of collision rate calculation process 53 will be described in detail. Collision detection section 5 reads from storage section 3 the number of test packets, C1, transmitted from the wireless communication device according to this embodiment and the number of packet collisions, C2, and obtains the collision rate according to formula (2) that follows. Finally, collision detection section 5 stores the calculated collision rate in storage section 3 (at step B6).

[Mathematical Expression 2]

Collision rate=C2/C1    Formula (2)

In formula (2), the right side denominator is the number of test packets that are transmitted, C1, and the numerator is the number of packet collisions, C2.

FIG. 4 shows the experimental result of a collision detection operation. Likewise, it is assumed that wireless device A is the wireless communication device according to this embodiment and that wireless device B, wireless device C, and wireless device D are wireless communication devices that comply with IEEE 802.11.

As shown in FIG. 4, it is assumed that wireless device A wirelessly transmits packets to wireless device B that is located 9 meters apart from wireless device A. It is also assumed that wireless device C wirelessly transmits packets to wireless device D located 9 meters apart from wireless device C. The packet transmission from wireless device A to wireless device B is referred to as flow1, whereas the packet transmission from wireless device C to wireless device D is referred to as flow2. The interference signal of flow2 to flow1 is a detection target. Thus, as flow2 is apart from flow1, the interference of flow2 to flow1 weakens.

In the example shown in FIG. 4, intensities of interference waves of flow2 to flow1 are obtained in six conditions in which the distances therebetween are 1 meter, 10 meters, 40 meters, 80 meters, 110 meters, and 200 meters. Flow2 is successively moved to these six positions. At each position, wireless device A transmits 1500-byte (fixed length) test packets to wireless device B at a transmission rate of 54 Mbps with a transmission power of 0 dBm for three seconds. At this point, wireless device C transmits 1500-byte (fixed length) test packets at a transmission rate of 6 Mbps with a transmission power of 0 dBm for 3 seconds. In this example, test transmission is executed with a transmission power of 0 dBm rather than the maximum transmission power so as to attenuate the interference of flow2 to flow1 in a limited moving distance (200 meters).

Threshold 1 is set to 35% of the average power of the test packets. In other words, assuming that the absolute value of the average power of test packets is P, threshold 1 becomes (P×0.35). In addition, threshold 2 is set to −35% of the average power of the test packets. In other words, when the absolute value of the average power of the test packets is denoted by P, threshold 2 becomes −(P×0.35). In addition, threshold 3 is set to 35% of the average power of the test packets. When the absolute value of the average power of the test packets is denoted by P, threshold 3 becomes (P×0.35). Table 2 shows collision detection results in test packet transmission periods at individual positions.

TABLE 2

| Distance | Number of collision packets | Number of transmission packets | Packet collision rate |
| --- | --- | --- | --- |
| 1 m | 71 | 437 | 16% |
| 10 m | 2196 | 2296 | 96% |
| 40 m | 3922 | 4032 | 97% |
| 80 m | 3509 | 4294 | 82% |
| 110 m | 2432 | 5131 | 47% |
| 200 m | 1998 | 6456 | 31% |

Table 2 tabulates the distances between flow 1 and flow2, the numbers of transmission packets, the numbers of packet collisions, and the packet collision ratios.

Next, the communication control operation of the wireless communication device according to this embodiment based on the categorized result of communication state categorization section 4 and the collision detection result of collision detection section 5 will be described in detail.

First, the communication control method of control section 6 based on the categorized result of communication state categorization section 4 of the wireless communication device according to this embodiment will be described in detail. Control section 6 of the wireless communication device according to this embodiment periodically checks for storage section 3 and determines whether or not the communication state has been updated. If control section 6 determines that the communication state has been updated, control section 6 outputs an operation command to communication section 1. Table 3 shows an example of operation commands that are output from control section 6 to communication section 1.

TABLE 3

| | communication state | |
|---|---|---|
| operation command | PA | Gray |
| Operation command 1 | Change channel | Change channel |
| Operation command 2 | Increase packet size | Decrease packet size |
| Operation command 3 | Change communication route | Change communication route |

Table 3 tabulates communication states (PA and Gray) and corresponding operation commands. Channel, packet size, and communication route are an example of transmission parameters.

As tabulated in Table 3, there are three operation commands that are operation command 1, operation command 2, and operation command 3. According to this embodiment, operation commands are assigned their priorities. Operation command 1 has higher priority than operation command 2; operation command 2 has higher priority than operation command 3. When the wireless communication device according to this embodiment executes operation command 1, which is a channel change command, the wireless communication device can transmit a signal through a channel on which there is no interference signal or through a channel that is less affected by another interference signal. If the communication state is PA, when the wireless communication device according to this embodiment executes operation command 2, which is packet size increase command, the wireless communication device can transmit much data in one transmission session and use a channel for a longer time and thereby improve the transmission efficiency. If the communication state is Gray, when the wireless communication device according to this embodiment executes operation command 2, which is packet size decrease command, since the channel use time for the transmission of one data packet decreases and the likelihood of a collision with another interference signal decreases, the transmission efficiency improves. When the wireless communication device according to this embodiment executes operation command 3, which is communication route change command, the wireless communication device can transmit a signal through another communication route in which there is an interference signal or through another communication route in which the influence of an interference signal is low.

Next, with reference to FIG. 11, the communication control operation in the case in which the communication state of the wireless communication device according to this embodiment has been updated and in which only one communication state has been detected will be described in detail.

First, the case in which control section 6 detects that the communication state has been updated to state PA will be described. If control section 6 detects that the communication state has been updated to the state PA, control section 6 sends operation command 1 "communication channel change command" to data transmission and reception section 12. When data transmission and reception section 12 receives the command (operation command 1) from control section 6, data transmission and reception section 12 quickly executes the operation according to the command (operation command 1). If data transmission and reception section 12 cannot execute the operation according to the command received from control section 6, data transmission and reception section 12 sends a signal that represents the failure of command execution to control section 6.

If control section 6 receives the signal that represents the failure of command execution from data transmission and reception section 12, control section 6 sends operation command 2 "packet size increase command", that has lower priority by one level than the preceding command, to data transmission and reception section 12. When data transmission and reception section 12 receives the command (operation command 2) from control section 6, data transmission and reception section 12 quickly executes the operation according to the command. If data transmission and reception section 12 cannot execute the operation according to the command (operation command 2) received from control section 6, data transmission and reception section 12 sends a signal that represents the failure of command execution to control section 6.

If control section 6 receives the signal that represents the failure of command execution from data transmission and reception section 12, control section 6 sends operation command 3 "communication route change command", that has lower priority by one level than the preceding command, to data transmission and reception section 12. When data transmission and reception section 12 receives the command (operation command 3) from control section 6, data transmission and reception section 12 quickly executes the operation according to the command. If data transmission and reception section 12 cannot execute the operation according to the command (operation command 3) received from control section 6, data transmission and reception section 12 sends a signal that represents the failure of command execution to control section 6.

If control section 6 receives the signal that represents the failure of command execution from data transmission and reception section 12 and if there is no operation command that has lower priority than the preceding command, control section 6 will not transmit an operation command until it detects that the communication state has been updated.

Thereafter, the case in which control section 6 detects that the communication state has been updated to the state Gray will be described. If control section 6 detects that the communication state has been updated to the state Gray, control section 6 sends operation command 1 "communication channel change command" to data transmission and reception section 12. When data transmission and reception section 12 receives the command (operation command 1) from control section 6, data transmission and reception section 12 quickly executes the operation according to the command (operation command 1). If data transmission and reception section 12 cannot execute the operation according to the command received from control section 6, data transmission and reception section 12 sends a signal that represents the failure of command execution to control section 6.

If control section 6 receives the signal that represents the failure of command execution from data transmission and reception section 12, control section 6 sends operation command 2 "packet size decrease command", that has lower priority by one level than the preceding command, to data transmission and reception section 12. When data transmission and reception section 12 receives the command (operation command 2) from control section 6, data transmission and reception section 12 quickly executes the operation according to the command. If data transmission and reception section 12 cannot execute the operation according to the command (operation command 2) received from control section 6, data transmission and reception section 12 sends a signal that represents the failure of command execution to control section 6.

If control section 6 receives the signal that represents the failure of command execution from data transmission and reception section 12, control section 6 sends operation command 3 "communication route change command", that has lower priority by one level than the preceding command, to data transmission and reception section 12. When data transmission and reception section 12 receives the command (operation command 3) from control section 6, data transmission and reception section 12 quickly executes the operation according to the command. If data transmission and reception section 12 cannot execute the operation according to the command (operation command 3) received from control section 6, data transmission and reception section 12 sends a signal that represents the failure of command execution to control section 6.

If control section 6 receives the signal that represents the failure of command execution from data transmission and reception section 12 and if there is no operation command that has lower priority than the preceding command, control section 6 will not send an operation command until it detects that the communication state has been updated.

Figure 12:
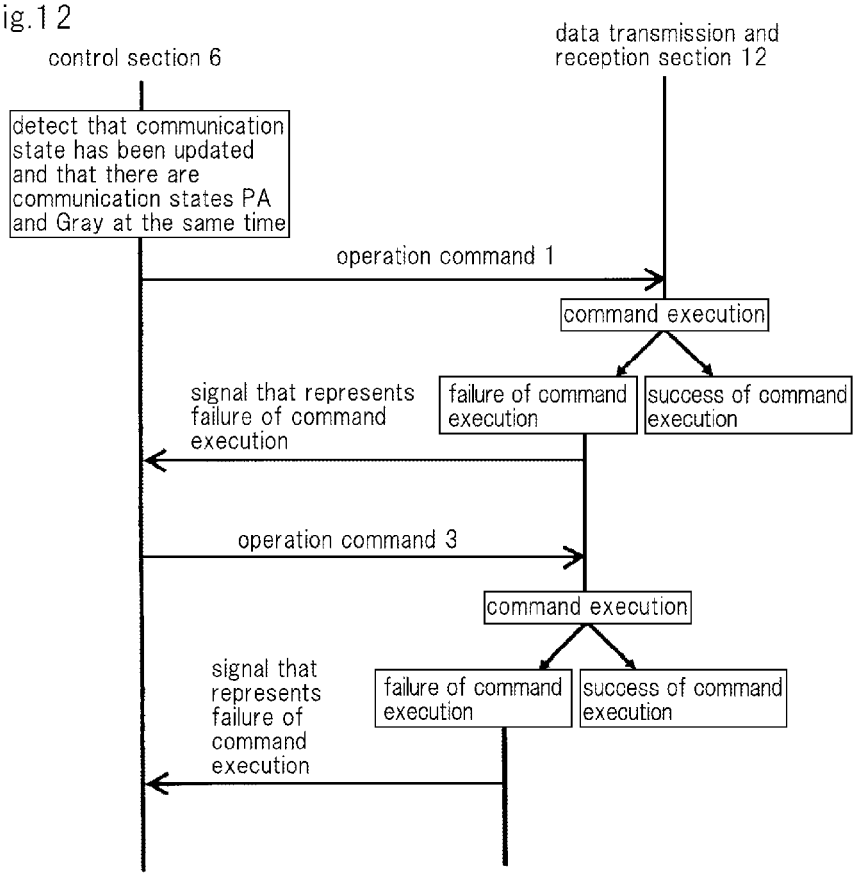
FIG. 12 is a schematic diagram showing a procedure of a communication control operation in which the wireless communication device according to the first embodiment identifies two communication states when a communication state has been updated.

Next, with reference to FIG. 12, the communication control operation in the case in which the communication state of the wireless communication device according to this embodiment has been updated and that two communication states have been detected will be described in detail.

If there are two or more interference sources, the communication states PA and Gray may simultaneously occur. If control section 6 detects that two communication states of PA and Gray are occurring simultaneously and that the communication state has been updated, control section 6 will send operation command 1 "communication channel change command" to data transmission and reception section 12. When data transmission and reception section 12 receives the command (operation command 1) from control section 6, data transmission and reception section 12 quickly executes the operation according to the command (operation command 1). If data transmission and reception section 12 cannot execute the operation according to the command received from control section 6, data transmission and reception section 12 sends a signal that represents the failure of command execution to control section 6.

If control section 6 receives the signal that represents the failure of command execution from data transmission and reception section 12, control section 6 sends operation command 3 "communication route change command", that has lower priority by one level than the preceding command, to data transmission and reception section 12. When data transmission and reception section 12 receives the command (operation command 3) from control section 6, data transmission and reception section 12 quickly executes the operation according to the command. If data transmission and reception section 12 cannot execute the operation according to the command (operation command 3), data transmission and reception section 12 will send a signal that represents the failure of command execution to control section 6.

If control section 6 receives the signal that represents the failure of command execution from data transmission and reception section 12 and if there is no operation command that has lower priority than the preceding command, control section 6 will not send an operation command until it detects that the communication state has been updated. If control section 6 detects that the communication state has been updated to the state Good, control section 6 will not send an operation command until the communication state has been updated.

Next, the communication control method of control section 6 based on the collision detection result of collision detection section 5 of the wireless communication device according to this embodiment will be described in detail.

Control section 6 of the wireless communication device according to this embodiment periodically checks storage section 3 to determine whether or not the collision rate has been updated. If control section 6 detects that the collision rate has been updated and that the collision rate is greater than threshold 4, control section 6 sends a transmission parameter adjustment command to data transmission and reception section 12. When data transmission and reception section 12 receives the transmission parameter adjustment command from control section 6, data transmission and reception section 12 quickly adjusts the transmission parameters according to the command. The transmission parameters include carrier sensing sensitivity, back-off time, and the transmission rate. The back-off time is a transmission standby time for an 802.11 wireless device. Threshold 4 depends on the performance of the device and communication application. For example, if the experiment shown in FIG. 4 is conducted, control section 6 refers to the collision detection result shown in Table 2 and sets threshold 4 to 80%.

If the collision rate is greater than threshold 4, for example, if carrier sensing sensitivity is the transmission parameter, the transmission parameter can be adjusted by improving the carrier sensing sensitivity. If transmission packet size is the transmission parameter, the transmission parameter can be adjusted by decreasing the transmission packet size. If transmission rate is the transmission parameter, the transmission parameter can be adjusted by increasing the transmission rate. It is preferable that these transmission parameters be selected and adjusted such that not only packet collisions can be prevented, but also such that the overall communication environment can be improved.

If data transmitted from the wireless communication device according to this embodiment interferes with another communication, the wireless communication device will determine in which one of the three communication states its own device lies. The wireless communication device can adjust the transmission parameters based on the determined communication state so as to improve transmission efficiency.

In addition, before the wireless communication device according to this embodiment starts transmitting data, it detects the occurrence of a test packet collision in the neighboring radio waves, calculates the collision rate of collisions, and appropriately adjusts the transmission parameters based on the collision detection result and collision rate. Thus, the wireless communication device according to this embodiment can improve the accuracy with which interference with another communication is detected, can prevent interference with another communication, and can improve transmission efficiency.

Second Embodiment

Next, with reference to the accompanying drawings, a wireless communication device according to a second embodiment of the present invention will be described. For the sake of simplicity, a detailed description of structural sections similar to those of the first embodiment will be omitted.

Figure 13:
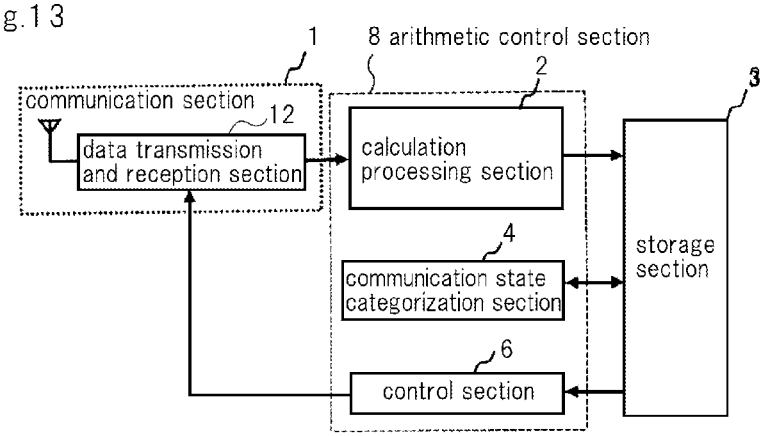
FIG. 13 is a block diagram showing an example of a structure of a wireless communication device according to a second embodiment.

FIG. 13 is a block diagram showing an example of a structure of the wireless communication device according to this embodiment. As shown in FIG. 13, the wireless communication device according to this embodiment has communication section 1, calculation processing section 2, storage section 3, communication state categorization section 4, and control section 6. According to this embodiment, communication section 1 is provided with data transmission and reception section 12 instead of signal sensing section 11 shown in FIG. 1.

The wireless communication device according to this embodiment is not provided with signal sensing section 11 and collision detection section 5 shown in FIG. 1. Thus, according to this embodiment, the transmission parameters that improve the transmission efficiency are adjusted based on the result that is output from communication state categorization section 4.

According to this embodiment, not only the transmission efficiency can be improved, but also the circuit structure of the wireless communication device can be simplified and thereby power consumption can be reduced without necessity of adjusting the transmission parameter of the collision rate that is output from collision detection section 5 shown in FIG. 1 or detecting collisions by collision detection section 5.

Third Embodiment

Next, with reference to the accompanying drawings, a wireless communication device according to a third embodiment of the present invention will be described. For the sake of simplicity, a detailed description of structural sections similar to those of the first embodiment will be omitted.

Figure 14:
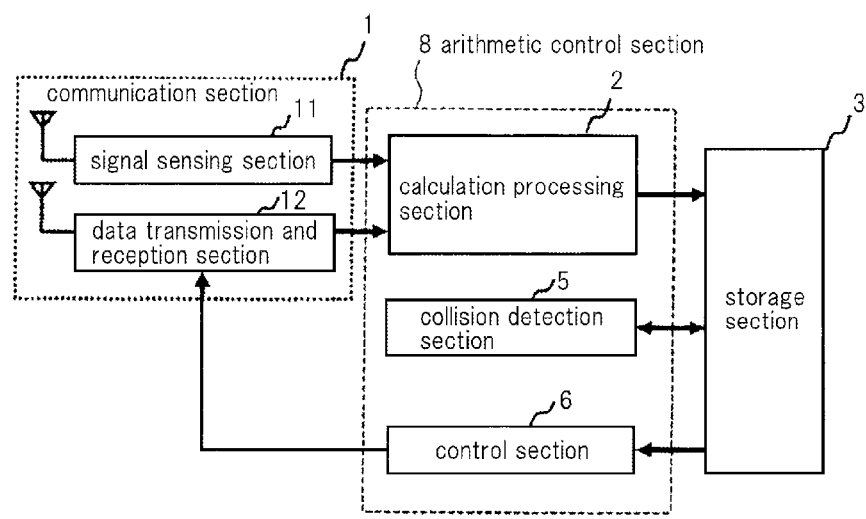
FIG. 14 is a block diagram showing an example of a structure of a wireless communication device according to a third embodiment.

FIG. 14 is a block diagram showing an example of the structure of the wireless communication device according to this embodiment. As shown in FIG. 14, the wireless communication device according to this embodiment has communication section 1, calculation processing section 2, storage section 3, collision detection section 5, and control section 6.

The wireless communication device according to this embodiment is not provided with communication state categorization section 4 shown in FIG. 4. Thus, according to this embodiment, the transmission parameter that improves the transmission efficiency is adjusted based on the result that is output from collision detection section 5.

According to this embodiment, not only can the transmission efficiency be improved, but also the circuit structure of the wireless communication device can be simplified and thereby power consumption can be reduced without necessity of adjusting the transmission parameter of the communication state that is output from communication state categorization section 4 shown in FIG. 1.

Fourth Embodiment

The wireless communication device according to the present invention can be applied to a base station that composes a mesh network. According to a fifth embodiment of the present invention, the wireless communication device according to the first embodiment is operated as a base station of the mesh network. Next, the structure of the mesh network according to the fourth embodiment will be described.

Figure 15:
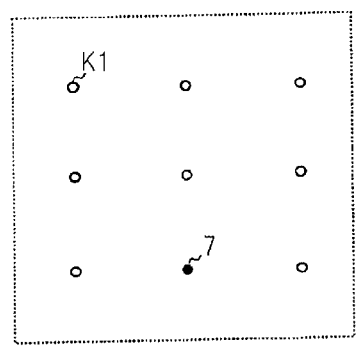
FIG. 15 is a schematic diagram showing an example of a mesh network according to a fourth embodiment, the mesh network having the wireless communication devices according to the first embodiment as base stations.

FIG. 15 is a schematic diagram showing an example of the mesh network in which the wireless communication device according to the first embodiment is configured as a base station. Circles shown in FIG. 15 represent base stations. The locations of the base stations are designated based on a real application and according to an ordinary installation method for mesh network base stations. One of a plurality of base stations functions as a network communication management section that manages communication in the network. In the following description, the network communication management section is referred to as the management station. In FIG. 15, the management station is denoted by reference numeral 7.

Next, the initial setup and operation for the mesh network according to this embodiment will be described in detail.

Figure 16:
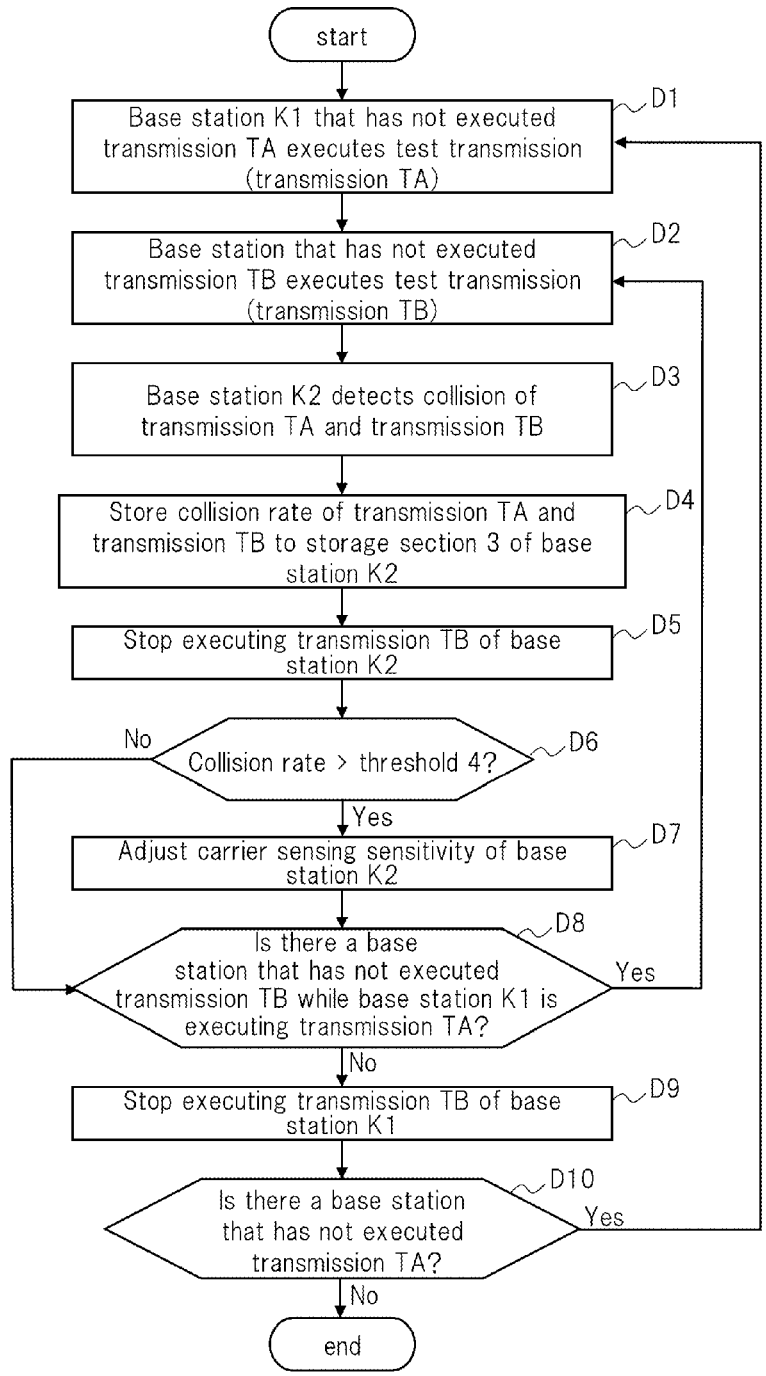
FIG. 16 is a schematic diagram describing an adjustment method for carrier sending sensibilies of the base stations in the mesh network according to the fourth embodiment.

The initial setup of the mesh network is performed in two stages of the adjustment of carrier sensing sensitivity of a base station and the measurement of communication quality of a communication path. First, with reference to FIG. 16, the adjustment of carrier sensing sensitivity of a base station in the mesh network will be described in detail.

After the locations of base stations in the mesh network have been designated, one base station is selected as management station 7 that manages intra-network communication. Management station 7 is automatically selected as a base station that has the minimum or maximum MAC address in the network. From a stability viewpoint, management station 7 needs to be preferentially selected from base stations that have a power supply, an uninterruptible power supply, and an Ethernet (registered trademark) connection. Management station 7 that has been selected transmits its own address to all base stations in the network. Each base station stores the address of management station 7 in storage section 3. If management station 7 has been changed to another base station, management station 7 that has been newly selected transmits its own address to all base stations in the network and each base station updates the address of management station 7 stored in storage section 3. Although several selection methods for the management station were exemplified, the present invention is not limited to these methods.

Thereafter, management station 7 sends a command to any one of base stations in the network so as to cause it to execute test transmission at a constant transmission rate (for example, 6 Mbps) with a maximum power (broadcast transmission) and to detect a collision (at step DD. In FIG. 15, a base station that executes test transmission is referred to as base station K1. The broadcast transmission is referred to as transmission TA. At this point, base stations other than base station K1 are idle.

Thereafter, management station 7 sends a command to any one of the idle base stations so as to cause it to execute test transmission on the same channel as base station K1 in a full operation state (at step D2). In this example, "full operation state" means that base station K1 continuously operates and it is assumed that the test transmission is broadcast transmission. In this example, the base station that executes the test transmission is referred to as base station K2. In this example, the broadcast transmission is referred to as transmission TB. The test transmission rate of base station K2 needs to be greater than the transmission rate of base station K1 (for example, 54 Mbps).

Thereafter, after base station K2 starts executing test transmission, management station 7 sends a command to base station K2 so as to cause it to detect a collision with test transmission executed by base station K1 (at step D3). After base station K2 detects a collision, it stores the collision rate of the test transmission executed by base station K1 in storage section 3 (at step D4).

Thereafter, management station 7 sends a command to base station K2 so as to cause it to stop executing the test transmission and return to the idle state (at step D5). Base station K2 compares the collision rate stored in storage section 3 with threshold 4 (at step D6). If the collision rate is greater than threshold 4, management station 7 adjusts the carrier sensing sensitivity so as to prevent interference with base station K1 (at step D7).

Thereafter, management station 7 successively sends a command to any base stations other than those that have executed transmission TA and transmission TB so as to cause them to execute the operation from step D2 to step D7 (at step D8). The operation from step D2 to step D8 prevents interference in the case that base station K1 and another base station in the network simultaneously communicate with each other. Thereafter, management station 7 sends a command to base station K1 so as to cause it to stop executing test transmission and return to the idle state again (at step D9).

Thereafter, management station 7 successively transmits a command to any base stations other than those that have executed transmission TA in the network so as to cause them to execute the operation from step D1 to step D7 (at step D10). The operation from step D1 to step D10 prevents interferences of all base stations in the network with each other.

Figure 17:
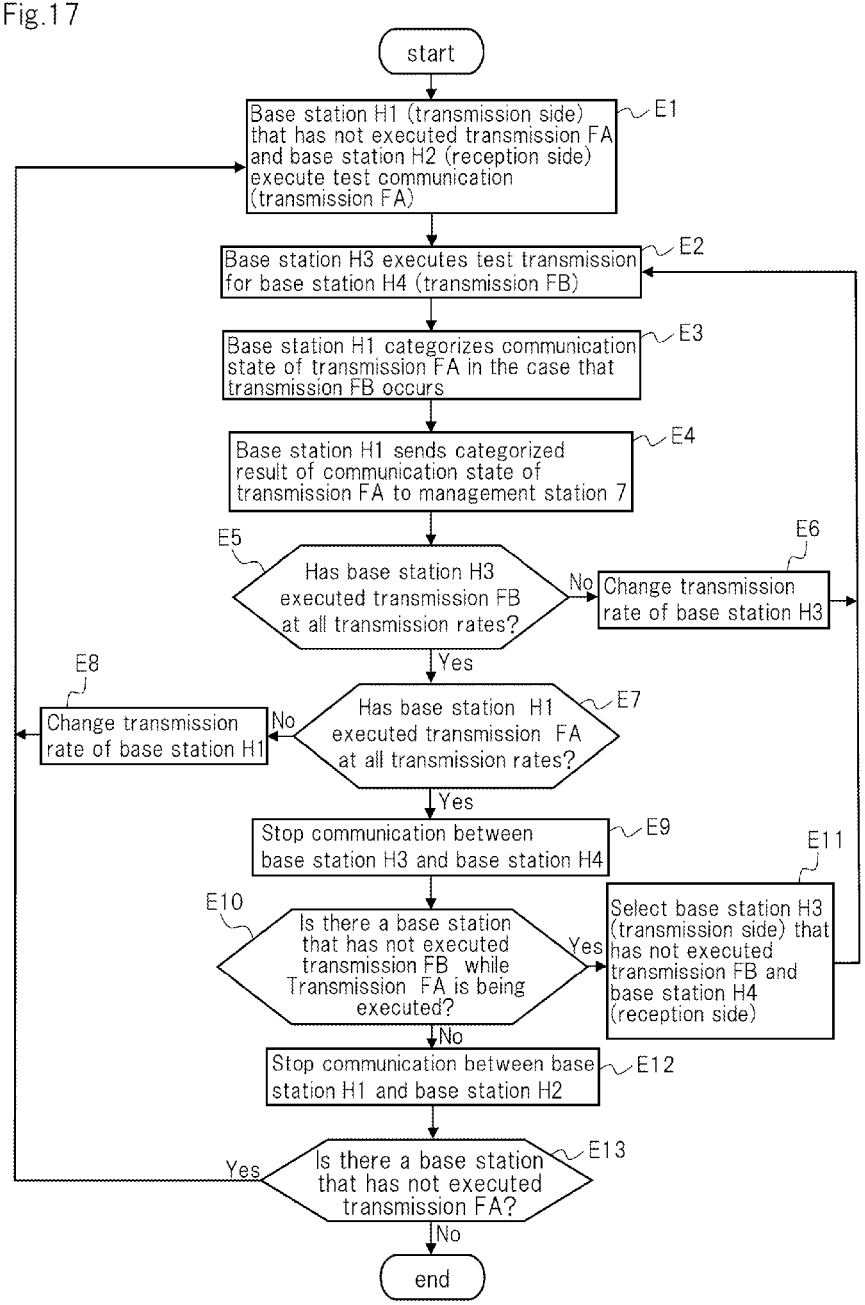
FIG. 17 is a schematic diagram describing a communication quality measurement method for communication paths in the mesh network according to the fourth embodiment.

Next, with reference to FIG. 17, the communication quality measurement operation for a communication path in the mesh network will be described in detail.

First, management station 7 sends a command to any one base station H1 in the network so as to cause it to execute test transmission for any one base station H2 from among base stations that are in the neighborhood of base station H1 (at step E1). This test transmission is referred to as transmission FA. Base station H1 executes test transmission for base station H2 at a fixed transmission rate in the full operation state. At this point, all base stations other than base station H1 and base station H2 are idle. Thereafter, management station 7 sends a command to any one base station H3 from among base stations other than base station H1 and base station H2 so as to cause it to execute test transmission for any one base station H4 from among base stations that are in the neighborhood of base station H3 (at step E2). It is assumed that this test transmission is unicast transmission. This test transmission is referred to as transmission FB. Base station H3 executes test transmission for base station H4 at a fixed transmission rate in the full operation state.

Thereafter, management station 7 sends a command to base station H1 so as to cause it to categorize the communication state of transmission FA (at step E3). After base station H1 has categorized the foregoing communication state, it sends to management station 7 information that includes the categorized result of the communication state of transmission FA in the case in which transmission FB occurs, the transmission rate of transmission FA, and the transmission rate of transmission FB (at step E4). When management station 7 receives from base station H1 the information that includes the categorized result of the communication state of transmission FA in the case in which transmission FB occurs, the transmission rate of transmission FA, and the transmission rate of transmission FB, management station 7 combines these information as one set and stores it to storage section 3.

Thereafter, management station 7 determines whether or not base station H3 has executed transmission FB at all transmission rates (at step E5). If base station H3 has not executed transmission FB at all transmission rates, management station 7 sends a command to base station H3 so as to cause it to change the transmission rate of the test transmission to one in a predetermined range (at step E6). Thereafter, management station 7 returns to step E2. "All transmission rates" means transmission rates in the predetermined range, for example, those shown in Table 1.

If base station H3 has executed transmission FB at all transmission rates (at step E5), management station 7 determines whether or not base station H1 has executed transmission FA at all transmission rates (at step E7). If base station H1 has not executed transmission FA at all transmission rates, management station 7 sends a command to base station H1 so as to cause it to change the transmission rate of test transmission to one in the predetermined range (at step H1) and then returns to step E1.

If base station H1 has executed transmission FA at all transmission rates (at step E7), management station 7 sends a command to base station H3 and base station H4 so as to cause base station H3 to stop executing test transmission and them to return to the idle state (at step E9).

While management station 7 is causing base station H1 to execute transmission FA at step E1, management station 7 determines whether or not there is a base station that has not executed transmission FB (at step E10). If there is a base station that has not executed transmission FB at step E10, management station 7 selects base station H3 (transmission side) that has not executed transmission FB and base station H4 (reception side) (at step E11), sends a command to base station H3 and base station H4 and then returns to step E2.

The operation from step E1 to step E10 allows management station 7 to detect the communication state of transmission FA in the case in which transmission FA at a particular base station and each communication path in the network communicate simultaneously.

If there is no base station that has not executed transmission FB, management station 7 sends a command to base station H1 and base station H2 so as to cause base station H1 stop executing test transmission and to cause these stations to return to the idle state (at step E12). Thereafter, management station 7 determines whether or not there is a base station that has not executed transmission FA (at step E13). If there is a base station that has not executed transmission FA, management station 7 returns to step E1.

The operation from step E1 to step E13 allows management station 7 to detect the communication states in the case in which all communication paths in the network communicate with other communication paths at individual transmission rates, correlates communication states and communication paths in all communication combinations, and stores the correlated information in storage section 3.

According to this embodiment, transmission FB at step E2 is unicast communication that base station H3 executes for base station H4. Alternatively, transmission FB may be broadcast communication that base station H3 executes. If transmission FB is broadcast communication that base station H3 executes, base station H4 becomes idle at step E2.

Figure 18:
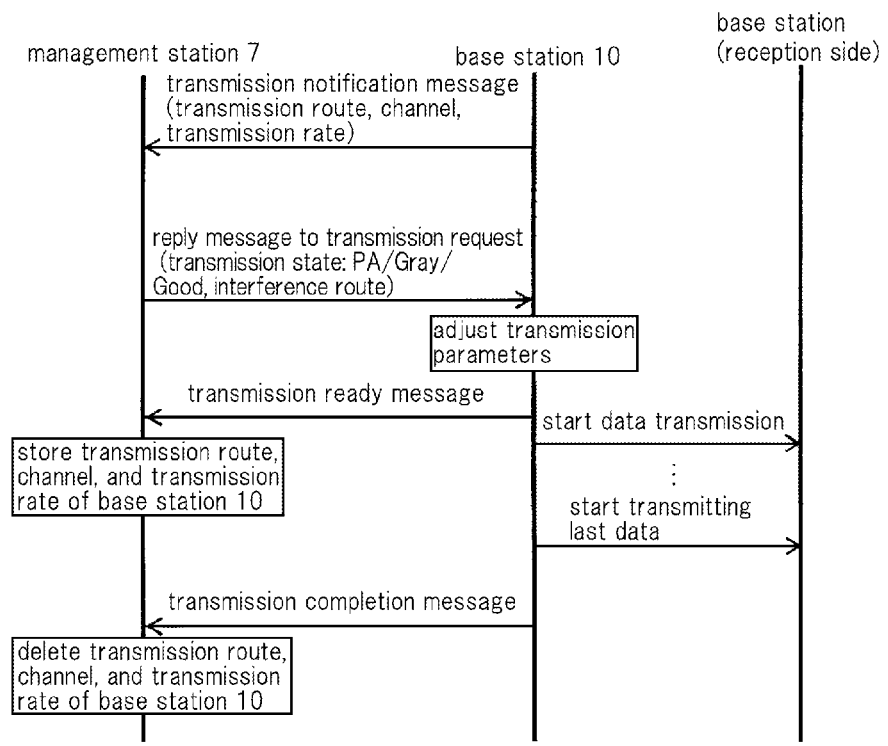
FIG. 18 is a sequence chart describing an operation method for the mesh network according to the fourth embodiment.

Next, with reference to FIG. 18, the operation method for the mesh network according to this embodiment will be described.

When one of a plurality of base stations that compose the mesh network according to this embodiment transmits data, the base station sends a transmission notification message that denotes that the base station is scheduled to transmit data to management station 7. In the following description, a base station that is scheduled to transmit data is referred to as base station 10. The transmission notification message contains information about a transmission route, through which base station 10 is scheduled to transmit data, and information concerning the transmission channel and the data transmission rate. If there is a base station that is transmitting data before base station 10 transmits data, communication state information, that includes the transmission route through which base station 10 transmits data, the transmission channel, and the data transmission rate, has been stored in storage section 3 of management station 7. This information in the case of base station 10 will be described later.

When management station 7 receives the transmission notification message from base station 10, management station 7 reads communication states in the case in which communication on a transmission route through which base station 10 is scheduled to transmit data interferes with existing communication in the network and sends a reply message that includes the communication state and transmission route of existing communication (interference route) to base station 10. Since correlated information of all combinations of communication states and communication paths and communication state information of base stations that are transmitting data have been stored in storage section 3, management station 7 can read the communication state of a transmission route through which base station 10 is scheduled to transmit data from storage section 3.

When base station 10 receives the reply message from management station 7, base station 10 stores information about the communication state contained in the reply message as the communication state of the transmission route through which base station 10 is scheduled to transmit data to storage section 3. Thereafter, control section 6 of base station 10 refers to Table 3 described in the first embodiment, reads an operation command corresponding to the communication state stored in storage section 3, and sends the operation command to data transmission and reception section 12 so as to control communication of data transmission and reception section 12. After control section 6 has controlled the communication of data transmission and reception section 12 and adjusted the transmission parameters, base station 10 sends a transmission ready message that denotes that it is ready to transmit data to management station 7. The transmission ready message contains information about the transmission route, through which base station 10 is scheduled to transmit data, and information concerning the transmission channel and the data transmission rate.

When management station 7 receives the transmission ready message from base station 10, management station 7 reads the information about the transmission route, transmission channel, and data transmission rate from the transmission ready message and stores the information as communication state information of base station 10 in storage section 3. Thereafter, base station 10 starts transmitting data through the transmission route on the transmission channel at the data transmission rate concerning which base station 10 has notified the management station. After base station 10 has transmitted the data, base station 10 sends a transmission completion message that represents the completion of the data transmission process to management station 7. When management station 7 receives the transmission completion message from base station 10, management station 7 deletes the communication state information of base station 10 from storage section 3.

If management station 7 receives the transmission notification message from base station 10, management station 7 always sends a reply message to base station 10 within a predetermined time (for example, 3 seconds). After base station 10 sends the transmission notification message to management station 7, if base station 10 cannot receive the reply message from management station 7 within the predetermined time (for example, 3 seconds), base station 10 quickly start transmitting data.

After base station 10 sends the transmission notification message to management station 7, if base station 10 cannot receive the reply message from management station 7 within the predetermined time, base station 10 may send the transmission notification message to management station 7 after an elapse of a predetermined time (for example, 3 seconds) again. In this case, after base station 10 sends the transmission notification message to management station 7 a predetermined number of times including retransmission (for example, three times), if base station 10 cannot receive the reply message from management station 7, base station 10 quickly starts transmitting the scheduled data. According to this embodiment, if base station 10 cannot receive the reply message from management station 7, base station 10 quickly starts transmitting the data. Alternatively, base station 10 may not quickly start transmitting the data.

According to this embodiment, since a mesh network is composed of wireless communication devices of the present invention, interference between each communication path in the network can be prevented.

The foregoing first to fourth embodiments were described based on the IEEE 802.11 wireless LAN standard. However, it should be noted that the present invention is not limited to such a standard and LAN.

Alternatively, the wireless communication method according to the present invention may be executed by a computer. In addition, the wireless communication method may be applied to a program that causes a computer to execute the method. The program may be stored in a record medium from which the computer can read the program.

According to the present invention, interference with another communication can be prevented and thereby data transmission efficiency can be improved.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

(Further exemplary embodiment 1) A wireless communication device, comprising: a data transmission and reception section that wirelessly transmits a plurality of test packets; a signal sensing section that senses a power of a spatial radio wave signal on a frequency channel that is the same as said plurality of test packets and outputs sample data of the sensed spatial radio wave signal; a calculation processing section that converts the sample data that are output from said signal sensing section into time series sample data in which the sample data are plotted in time series; a collision detection section that determines whether or not there is a packet collision due to interference of said plurality of test packets with another communication based on said time series sample data and calculates a packet collision rate based on the number of packet collisions and the number of said plurality of test packets that have been transmitted if said packet collision occurs; and a control section that adjusts a parameter that said data transmission and reception section uses to transmit data based on a calculation result of said collision detection section.

(Further exemplary embodiment 2) A wireless communication device, comprising: a data transmission and reception section that wirelessly transmits and receives packets and performs a statistical process for transmission and reception parameters that are associated with transmission and reception of the packets; a calculation processing section that calculates communication evaluation parameters including a busy rate that represents a ratio of a time for which it is determined that a channel, that is the same channel as its own device, is used to transmit and receive packets, a packet transmission success rate, and a standard deviation of the packet transmission success rates based on a result of the statistical process of said transmission and reception parameters calculated by said data transmission and reception section; a communication state categorization section that determines a communication state that represents an influence rate of interference with another communication based on said communication evaluation parameters calculated by said calculation processing section; and a control section that adjusts parameters that said data transmission and reception section uses to transmit data based on a communication state determined by said communication state categorization section.

(Further exemplary embodiment 3) The wireless communication device according to Further exemplary embodiment 2, wherein said communication state categorization section determines that a non-interference state in which influence of interference with another communication is low occurs if said packet transmission success rate is greater than a predetermined first reference value and if said busy rate is equal to or smaller than a predetermined second reference value, determines that said communication state is a communication anomaly state in which an communication anomaly occurs if said packet transmission success rate is greater than said first reference value and if said busy rate is greater than said second reference value, and determines that said communication state is a communication interference state in which interference with another communication occurs if said packet transmission success rate is equal to or smaller than said first reference value and if said standard deviation of packet transmission success rates is greater than a predetermined third reference value.

(Further exemplary embodiment 4) The wireless communication device according to Further exemplary embodiment 3, wherein said control section causes said data transmission and reception section to change any one from among a channel, a packet size, and a communication route if said communication state is said communication anomaly state or said communication interference state.

(Further exemplary embodiment 5) A wireless communication device, comprising: a wireless communication device according to Further exemplary embodiment 1; and a wireless communication device according to Further exemplary embodiment 2, wherein said wireless communication device according to Further exemplary embodiment 1 and said wireless communication device according to Further exemplary embodiment 2 are integrated.

(Further exemplary embodiment 6) A network, comprising: a plurality of wireless communication devices according to Further exemplary embodiment 5 arranged as base stations.

(Further exemplary embodiment 7) A wireless communication method, comprising: wirelessly transmitting and receiving packets and performing a statistical process for transmission and reception parameters that are associated with transmission and reception of the packets; calculating communication evaluation parameters including a busy rate that represents a ratio of a time for which it is determined that a channel, that is the same channel as its own device, is used to transmit and receive packets, a packet transmission success rate, and a standard deviation of the packet transmission success rates based on a result of the statistical process of said transmission and reception parameters; determining a communication state that represents an influence rate of interference with another communication based on said communication evaluation parameters; and adjusting parameters used to transmit data based on said determined communication state.

(Further exemplary embodiment 8) A computer readable record medium that records a program that causes a computer to execute a process, comprising: wirelessly transmitting and receiving packets and performing a statistical process for transmission and reception parameters that are associated with transmission and reception of the packets; calculating communication evaluation parameters including a busy rate that represents a ratio of a time for which it is determined that a channel, that is the same channel as its own device, is used to transmit and receive packets, a packet transmission success rate, and a standard deviation of the packet transmission success rates based on a result of the statistical process of said transmission and reception parameters; determining a communication state that represents an influence rate of interference with another communication based on said communication evaluation parameters; and adjusting parameters used to transmit data based on said determined communication state.

What is claimed is:

1. A wireless communication device, comprising:

a data transmission and reception section that wirelessly transmits and receives packets and performs a statistical process for transmission and reception parameters that are associated with transmission and reception of the packets;

a calculation processing section that calculates communication evaluation parameters including a busy rate that represents a ratio of a time for which it is determined that a channel, that is the same channel as its own device, is used to transmit and receive packets, a packet transmission success rate, and a standard deviation of the packet transmission success rates based on a result of the statistical process of said transmission and reception parameters calculated by said data transmission and reception section;

a communication state categorization section that determines a communication state that represents an influence rate of interference with another communication based on said communication evaluation parameters calculated by said calculation processing section; and a control section that adjusts parameters that said data transmission and reception section uses to transmit data based on a communication state determined by said communication state categorization section.

2. The wireless communication device according to claim 1, wherein said communication state categorization section determines that a non-interference state in which influence of interference with another communication is low occurs if said packet transmission success rate is greater than a predetermined first reference value and if said busy rate is equal to or smaller than a predetermined second reference value, determines that said communication state is a communication anomaly state in which an communication anomaly occurs if said packet transmission success rate is greater than said first reference value and if said busy rate is greater than said second reference value, and determines that said communication state is a communication interference state in which interference with another communication occurs if said packet transmission success rate is equal to or smaller than said first reference value and if said standard deviation of packet transmission success rates is greater than a predetermined third reference value.

3. The wireless communication device according to claim 2, wherein said control section causes said data transmission and reception section to change any one from among a channel, a packet size, and a communication route if said communication state is said communication anomaly state or said communication interference state.

4. A wireless communication device, comprising:
a first wireless communication device; and
a second wireless communication device according to claim 1,
wherein said first wireless communication device, comprises: a data transmission and reception section that wirelessly transmits a plurality of test packets; a signal sensing section that senses a power of a spatial radio wave signal on a frequency channel that is the same as said plurality of test packets and outputs sample data of the sensed spatial radio wave signal; a calculation processing section that converts the sample data that are output from said signal sensing section into time series sample data in which the sample data are plotted in time series; a collision detection section that determines whether or not there is a packet collision due to interference of said plurality of test packets with another communication based on said time series sample data and calculates a packet collision rate based on the number of packet collisions and the number of said plurality of test packets that have been transmitted if said packet collision occurs; and a control section that adjusts a parameter that said data transmission and reception section uses to transmit data based on a calculation result of said collision detection section, and
wherein said first wireless communication device and said second wireless communication device are integrated.

5. A network, comprising: a plurality of wireless communication devices according to claim 4 arranged as base stations.

6. A wireless communication method, comprising:
wirelessly transmitting and receiving packets and performing a statistical process for transmission and reception parameters that are associated with transmission and reception of the packets;
calculating communication evaluation parameters including a busy rate that represents a ratio of a time for which it is determined that a channel, that is the same channel as its own device, is used to transmit and receive packets, a packet transmission success rate, and a standard deviation of the packet transmission success rates based on a result of the statistical process of said transmission and reception parameters;
determining a communication state that represents an influence rate of interference with another communication based on said communication evaluation parameters; and
adjusting parameters used to transmit data based on said determined communication state.

7. A non-transitory computer readable record medium that records a program that causes a computer to execute a process, comprising:
wirelessly transmitting and receiving packets and performing a statistical process for transmission and reception parameters that are associated with transmission and reception of the packets;
calculating communication evaluation parameters including a busy rate that represents a ratio of a time for which it is determined that a channel, that is the same channel as its own device, is used to transmit and receive packets, a packet transmission success rate, and a standard deviation of the packet transmission success rates based on a result of the statistical process of said transmission and reception parameters;
determining a communication state that represents an influence rate of interference with another communication based on said communication evaluation parameters; and
adjusting parameters used to transmit data based on said determined communication state.

* * * * *